United States Patent Office 3,263,305
Patented August 2, 1966

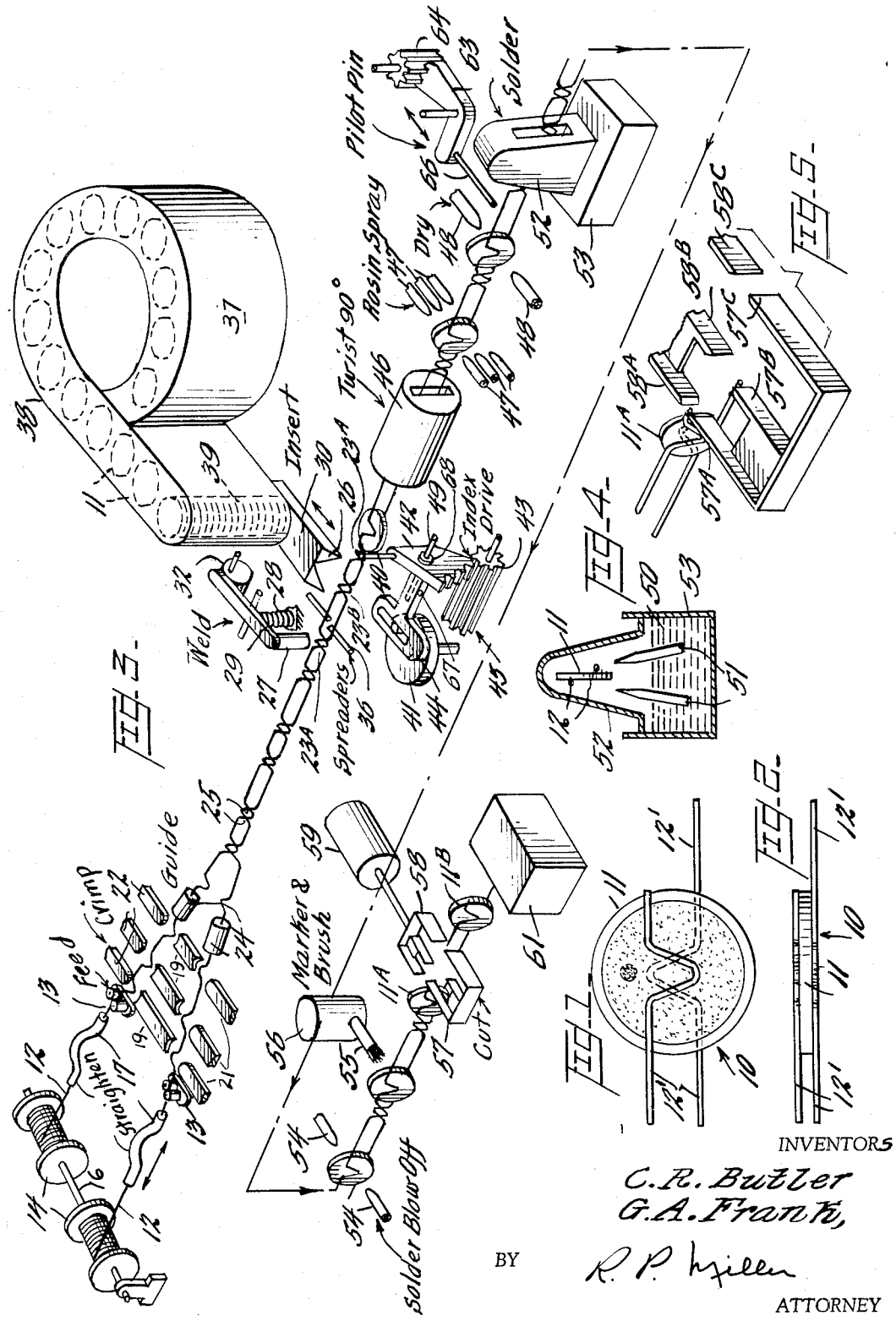

3,263,305
CONTINUOUS METHOD OF CONVEYING AND FORMING ELECTRICAL COMPONENTS
Claude R. Butler, Emmaus, and Gerard A. Frank, Allentown, Pa., assignors to Western Electric Company, Incorporated, New York, N.Y., a corporation of New York
Filed May 7, 1963, Ser. No. 278,714
9 Claims. (Cl. 29—155.5)

This invention relates to a continuous method of conveying and forming electrical components and more particularly to a method of forming silicon carbide varistors by inserting varistor discs between an overlapping portion of a pair of continuous, crimped wires, which wires are subsequently cut to form terminals.

In the prior art it has been customary to assemble varistors manually by individually cutting and forming wires that serve as terminals, placing the terminals on a silicon carbide disc, and soldering the terminals to the disc. All fabricating, assembling and transporting operations are performed by individual machines or manual operations because the individual component elements do not lend themselves to automatic handling and assembly.

It is an object of the present invention to provide a new and improved method of conveying and forming electrical components such as varistors, or other articles.

It is another object of the invention to provide a method of making varistors wherein a pair of spaced wires are crimped to serve as a carrier for varistor discs, the wires subsequently being cut to provide terminals for the varistor.

It is still a further object of the invention to provide a method of conveying articles wherein a pair of wires is crimped at sections along the length of the wires, every other one of which crimped sections is joined or welded together to provide a loop for engagement with an indexing device and the unwelded crimped sections provide article holding sections between each of the welded sections.

With these and other objects in mind, the present invention contemplates a method of conveying and forming varistors wherein a pair of spaced wires are crimped into overlapping sections to provide a continuous support and conveyor for body or disc sections of the varistors. Alternate ones of the overlapping sections are welded together leaving the intermediate unwelded overlapping sections to receive and support the varistor disc sections. The welded sections are engaged by indexing pins which feed the wires with the discs through various fabrication steps such as soldering the inserted disc sections to the wires. At the conclusion of the fabrication teps the conveyor wires are cut to provide terminals for the completed varistor.

Other objects and advantages of the invention will become apparent upon consideration of the following detailed description, in conjunction with the accompanying drawings, in which:

FIG. 1 is a plan view of an electrical component such as a varistor which may be formed by the method of the present invention;

FIG. 2 is a side view of the electrical component shown in FIG. 1.

FIG. 3 is a schematic view of a series of fabrication stations for performing crimping, welding, inserting, soldering, cutting, and other steps embodying the principles of the present invention;

FIG. 4 is a cross-sectional view of a soldering station in which the disc is soldered to the pair of crimped wires; and FIG. 5 is a schematic view of a cutting station showing three pairs of blades which cooperate to cut the wires to form terminals for the electrical component.

Referring to the drawings and in particular to FIGS. 1 and 2, there is shown an electrical component such as a varistor 10 having a silicon carbide disc 11 and terminals 12'. The terminals 12' are formed from a pair of wire-like members such as wires 12 which have been crimped into overlapping relationship, one wire being soldered to either side of the disc. Varistors of this type may be formed by the method comprising the instant invention, although it is to be understood that this varistor is only used as an example and that other articles can be formed and conveyed by the method of the instant invention.

Referring to FIG. 3 there is shown a pair of reels 14 containing wire 12 mounted on a common supporting shaft 16. The wires 12 are relatively stiff but resilient and are comprised of material having good electrical conductivity properties. The wires 12 are fed in the same direction from the reels 14 by any conventional feeding means such as feed rollers 13 through a pair of pigtail dies 17 for straightening the wires. The dies 17 rotate on their longitudinal axis and also reciprocate along a line in the direction of the wire feeding. Any other straightening device such as a plurality of vertical, spaced rollers through which the wires are drawn may be used.

Next is shown a bank of three stationary forming dies 19 positioned between the two wires 12. On either side of wires 12 is a bank of reciprocating forming dies 21 and 22 which cooperate with stationary dies 19 to crimp wires 12 simultaneously in three positions to form bowed or crimped sections projecting toward each other. Note that the dies in each bank are not equidistant, one die in each bank being further spaced from the middle die of that bank than the other. The crimped wire is then fed through a pair of enclosed guides 24 to guide the crimped sections into overlapping relationship to form a chain or a series of loops. Each loop is comprised of two crimped sections which overlap and are in contact to provide two joints 25.

In order that the loops may be utilized in feeding it is desirable to join alternate crimped sections together. These joined sections can subsequently be engaged by an indexing means to feed the wires. This operation is performed at the next station by a welding apparatus comprising an electrode 27 mounted on a pivotable arm 29. Spring 28 urges the arm 29 and electrode 27 into a retracted position away from the wires. Rotation of a cam 32 pivots arm 29 and electrode 27 into engagement with the joints 25 of the crimped sections of the wires to weld the two wires together to form welded crimped loops or sections 23A. The rotation of cam 32 is synchronized with the movement of the wires 12 such that alternate crimped loops or sections 23A are welded together leaving therebetween unwelded crimped loops or sections 23B. Other driving means such as an air cylinder or a rack and pinion mechanism could be used to reciprocate electrode 27. Similarly, the joining of the crimped sections at joints 25 of the loops may be performed by other means such as by soldering, cementing, or tying the joints 25 together.

At the next station a silicon carbide varistor disc 11 is inserted between each unwelded crimped loop or section 23B. In order to facilitate such insertion, it may be desirable to provide spreading devices 36 which may be of any desired shape. The spreaders 36 are reciprocated by any means such as an air cylinder (not shown) in a direction generally transverse to the movement of the wires. As the spreaders 36 move into the path of the wires, the spreaders act to cam the wires apart. With the wires in spaced apart relationship, a pusher member 30 carrying a disc 11 is reciprocated by any means such as an air cylinder or rack and pinion (not shown) into the path of the unwelded crimped loop or section 23B to position the disc 11 between the crimped wires. The pusher 30 may be provided with beveled portions 26 to further facilitate the spreading of the wires. Pusher 30 is notched at its forward extremity and is loaded on each reciprocation by means of a conventional vibratory feeder 37 which feeds a continuous supply of discs 11 along track 38 to a vertical chute or stacking device 39. As pusher 30 is reciprocated on a return stroke away from wires 12, the bottom disc 11 in stacking device 39 is engaged in the notch between beveled portions 26. The pusher 30 is now loaded to feed another disc 11 to the next unwelded crimped section 23B.

Up to this point, the wires 12 and discs 11 have been positioned and advanced generally in parallel relationship in a horizontal plane. Because of the nature of the subsequent operations to be performed on the varistors, it is desirable to rotate the wires 90° so that the wires and discs are in a vertical plane. This is accomplished by passing the wires 12 with discs 11 through a guide member 46 which includes a tortuous passageway.

The discs 11 are then fed past two banks of nozzles 47 which spray a rosin onto the discs 11 and a pair of air jets 48 which dry the rosin. The wires 12 and discs 11 are then fed through an enclosed solder bath, see FIG. 4, which permanently secures the discs 11 to the wires 12. Prior to this time in the operation, the discs have been held between the crimped sections by the spring action or the resiliency of the wires resulting from the welded sections immediately preceding and succeeding each of the discs.

The soldering bath is comprised of a tank 53 having a reservoir of solder 50 and a shield 52. Solder is pumped through a plurality of nozzles 51 by any conventional pumping means (not shown) to spray intermittently or continuously the liquid solder 50 against the discs 11 and crimped sections 23B as they pass through the bath. Excess solder is then blown off by air jets passing through a pair of nozzles 54. If desired, the discs 11 may be marked for identification by a reciprocating brush 55 containing a marking die supplied by a tank 56.

At the next station the wires 12 are cut so as to form terminals for the varistors. The cutting station is comprised of three stationary cutting blades 57 and three cooperating, reciprocating cutting blades 58 driven by an air cylinder 59 or other conventional means such as a rack and pinion or a camming device (not shown). Blades 58 are driven in timed relationship with the movement of the discs 11 so as to be reciprocated into engagement with the stationary blades 57 between two adjacent discs 11A and 11B. Blades 57A and 58A (see FIG. 5) cooperate to cut the upper wire flush with disc 11A leaving no projecting wire. Blades 57B and 58B are spaced ahead of disc 11A and cooperate to cut the lower wire at a point advanced from disc 11A to leave a section of wire to serve as a terminal. Blades 57C and 58C, acting simultaneously with blades 57A, 58A, 57B, 58B, cooperate to cut both the upper and lower wires at a point spaced from disc 11B. This provides disc 11B with two trailing terminals and one leading terminal which was formed by the previous cutting cycle. Each finished varistor 10 is thus provided with three wire terminals 12' formed from the wire 12. The varistors fall into a receptacle 61 after each cutting operation. As an alternative, the cutting dies may be mounted to reciprocate and span a disc 11, thus simultaneously severing the wires about a single disc.

A driving mechanism 45 for intermittently conveying or indexing the chain formed by the two crimped welded wires may comprise a vertical indexing pin 40 secured to the end of a gear segment rocker 42 which is driven by a pinion gear 43. Gear segment rocker 42 is free to pivot on a pin 49 and slide on the pinion 43. The pin 49 is secured to a scotch yoke 44 by a set screw 67. A pair of snap rings 68 are mounted on the pin 49 one on either side of the gear segment 42. The scotch yoke 44 is intermittently reciprocated by means of an intermittently rotating wheel and pin 41. Oscillation of the pinion 43 pivots the pin 40 into engagement with the welded crimped section above the pin. Rotation of the wheel and the pin 41 causes reciprocation of the scotch yoke 44 which in turn reciprocates the gear segment 42 and the pin 40 which indexes the wire chain one step. The pin 40 can then be disengaged by reverse oscillation of the pinion 43 and returned to its initial position. A standard hitch feed or sprocket wheel could also be used to intermittently index the wire chain in place of the gear segment rocker and scotch yoke. A plurality of indexing pins 40 may also be synchronously driven to lessen the strain at various sections of the wire chain. It may also be desirable to provide a pilot pin 66 which engages a welded crimped section during each fabrication step and while the indexing pin 40 is being retracted after an indexing step. This pin will prevent retrograde movement of the wire chain. The pilot pin 66 may be pivoted into engagement with the loop of a welded crimped section by a gear segment rocker 63 driven by a pinion gear 64.

In practice of the method, wire is drawn from the reels 14 by the feed rollers 13 through the wire straighteners 17 to the wire crimping dies 19, 21, and 22. After crimping, the wires are guided into overlapping relationship by the guides 24 to form loops. The welding electrode 27 is then pivoted into engagement with a loop as shown at 23A to weld the wire at joints 25 thus forming a welded loop or wire chain. The welded loop 23A is then intermittently conveyed or indexed to a position beyond the reciprocating pusher 30. Before the succeeding loop at position 23A is welded, a disc 11 is inserted between the unwelded loop 23B by the pusher 30. The welding electrode 27 then performs another cycle to weld another loop 23A which holds the inserted disc in the unwelded loop 23B by the resiliency of the wire.

It is to be understood that a pair of loops 23A spanning a loop 23B may be welded simultaneously by a pair of electrodes. The discs may then be inserted in a loop 23B between the two welded loops 23A into the gap formed by the spreaders 36.

The driving mechanism 45 and the cam 32 are driven in timed relationship so that only every other crimped section is welded. The spreaders 36 insure that the pusher 30 may move freely between the wires 12 to deposit a disc. The wires and the discs are then rotated 90° by the guide 46 so that the discs are vertically oriented. The discs and wires are then sprayed with liquid rosin by the nozzles 47, and dried by air from the nozzles 48. The discs are then permanently secured to the wires by a liquid solder bath from the nozzles 51, and excess solder is blown off by air from the nozzles 54. The discs are marked by the brush 55 after which the wires 12 are cut by the cutter blades 57 and 58 to form terminals 12' for the varistors.

It is to be understood that the above-described sequence of fabrication steps is simply illustrative of an application of the principles of the invention, and many other modifications may be made without departing from the invention.

What is claimed is:

1. A method of forming electrical components having a body portion and at least one terminal attached thereto comprising the steps of:

deforming sections in a pair of spaced wires,
overlapping the deformed sections,
joining alternate overlapping deformed sections leaving an unjoined overlapping section therebetween,
engaging at least one of the joined sections to index the pair of wires,
inserting a body portion between the unjoined overlapping section,
securing the body portion to the wires, and
removing the wires on both sides of the body portion to provide at least one terminal.

2. A method of forming electrical components having a disc body portion and terminals comprising the steps of:

crimping sections in a pair of spaced wires at predetermined intervals,
guiding the crimped sections into overlapping relationship,
welding alternate crimped sections together leaving unwelded crimped sections therebetween,
engaging at least one of the welded crimped sections to index the pair of wires,
inserting discs between the unwelded crimped sections,
joining said discs to the unwelded crimped sections, and
cutting the wires on the both sides of the disc to provide terminals for the electrical component.

3. A method of forming electrical components having a disc and a plurality of terminals attached thereto comprising the steps of:

advancing a pair of spaced wires,
crimping predetermined sections of the wires toward each other,
overlapping the crimped sections,
welding a first overlapping portion to form a closed loop,
advancing a pin to engage said closed loop to index the pair of wires,
inserting a disc in the overlapping portion immediately succeeding said first welded section,
welding a second overlapping portion immediately succeeding said disc to hold the disc in place,
spraying the wires and the disc with a liquid solder to secure the disc to the wires, and
cutting the wires on either side of the disc to provide terminals for the electrical component.

4. A method of making electrical components having a body portion and terminals attached thereto comprising the steps of:

advancing a pair of spaced resilient wires,
deforming portions of said wires,
overlapping the deformed portions to form loops,
welding a first overlapping section together to provide a closed loop,
engaging said loop to index the wires,
spreading the resilient wires succeeding the first welded overlapping section to provide a gap at a second overlapping section,
inserting a body portion into said gap,
moving the wires together at the second overlapping section to allow the resiliency of the wires to hold the body portion in place,
welding together a third overlapping section succeeding said second section and body portion,
soldering said body portion to the wires, and
cutting said wires emanating from the body portion to provide terminals for the electrical component.

5. A method of conveying varistor discs and forming a varistor which comprises:

deforming spaced sections of a pair of advancing wires to form bows projecting toward each other,
guiding the wires to move the bows into overlapping relationship to form loops,
joining the overlapping joints of each alternate pair of bows,
engaging and advancing each joined pair of bows to advance the wires,
spreading the unjoined bows,
feeding varistor discs into the spread pairs of unjoined bows,
moving the unjoined bows toward each other to grip the varistor discs,
applying solder to the varistor discs to secure the discs to the unjoined bows, and
severing the wires extending from the varistor discs to form terminals for each succeeding varistor disc.

6. A method of making electrical components having discs and extending terminals comprising the steps of:

advancing a pair of spaced resilient wires in the same direction,
deforming spaced sections of the wires to form pairs of bowed sections projecting toward each other,
guiding the wires to advance the pairs of bowed sections into overlapping relationship,
welding alternate pairs of bowed sections to form closed loops,
inserting a disc between unwelded bowed sections lying between alternate pairs of welded bowed sections,
moving an indexing pin into engagement with a closed loop to index the discs and bowed sections,
applying rosin to the moving discs,
drying the rosin on the moving discs,
applying liquid solder to the unwelded bowed sections and discs to secure the discs to bowed sections,
removing excess solder from the discs and bowed sections, and
severing the wires extending between the discs to form terminals for each disc.

7. A method of conveying articles comprising:

guiding a pair of wire-like members in spaced relationship,
deforming the members to form crimped sections at the same position along the length of each member,
overlapping the crimped sections,
joining alternate crimped sections together to form joined loops leaving therebetween crimped sections of unjoined loops,
inserting articles between the unjoined loops, and
then engaging joined loops to advance the members.

8. A method of conveying articles comprising:

guiding a pair of resilient wire-like members toward one another, said members having spaced inwardly projecting bowed sections,
overlapping the bowed sections to form loops,
joining the bowed sections of alternate loops,
spreading apart the unjoined bowed sections between the joined loops,
feeding an article into the spread apart section,
releasing the spread apart bowed section to allow the resilient members to grip the article, and
engaging at least one of the joined bowed sections to convey the resiliently gripped article.

9. The method of conveying articles comprising:

crimping a pair of wire-like members at predetermined positions along the length of each of the members to provide three pairs of crimped sections in juxtaposition,
guiding the pairs of crimped sections into overlapping relationship to form loops,
welding a first crimped section to form a closed loop,
spreading the members of an unwelded crimped section immediately succeeding said first crimped section to provide a gap therebetween, inserting an article into said gap of the unwelded crimped section, welding a second crimped section immediately succeeding said unwelded crimped section to hold the article in position, and engaging and advancing a welded closed loop to advance the unwelded crimped sections and the article.

References Cited by the Examiner

UNITED STATES PATENTS 2,767,532 10/1956 Bossi _____ 53—14
2,823,789 2/1958 Henning _____ 198—131

JOHN F. CAMPBELL, *Primary Examiner.*

WHITMORE A. WILTZ, *Examiner.*

R. W. CHURCH, *Assistant Examiner.*